United States Patent
Lai

(10) Patent No.: US 9,052,007 B2
(45) Date of Patent: Jun. 9, 2015

(54) GEAR-SHIFTING MECHANISM FOR VEHICLES

(71) Applicant: Kwang Yang Motor Co., Ltd., Kaohsiung (TW)

(72) Inventor: Chien-Hung Lai, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 99 days.

(21) Appl. No.: 13/687,209

(22) Filed: Nov. 28, 2012

(65) Prior Publication Data
US 2013/0139635 A1 Jun. 6, 2013

(30) Foreign Application Priority Data
Dec. 2, 2011 (TW) .............................. 100222814 U

(51) Int. Cl.
*F16H 63/32* (2006.01)
*F16H 57/02* (2012.01)
*F16H 59/02* (2006.01)
*F16H 57/033* (2012.01)
*F16H 57/035* (2012.01)
*F16H 37/02* (2006.01)

(52) U.S. Cl.
CPC .............. *F16H 59/02* (2013.01); *F16H 57/033* (2013.01); *F16H 57/035* (2013.01); *F16H 2037/023* (2013.01); *F16H 2057/0203* (2013.01); *F16H 2057/02065* (2013.01)

(58) Field of Classification Search
USPC ........ 74/329, 325, 335, 337.5, 473.1, 473.36, 74/473.37, 606 R
See application file for complete search history.

(56) References Cited

U.S. PATENT DOCUMENTS

| | | | | |
|---|---|---|---|---|
| 4,339,964 A * | 7/1982 | Isaka | ........................... | 74/606 R |
| 4,655,309 A * | 4/1987 | Imaizumi et al. | ............. | 180/215 |
| 5,704,251 A * | 1/1998 | Alber et al. | ................ | 74/473.25 |
| 6,296,073 B1 * | 10/2001 | Rioux et al. | .................. | 180/292 |
| 6,308,797 B1 * | 10/2001 | Hacker et al. | ................. | 180/230 |
| 6,962,096 B2 * | 11/2005 | Hojyo | ......................... | 74/606 R |
| 7,174,800 B2 * | 2/2007 | Kawakubo et al. | .......... | 74/337.5 |
| 7,258,031 B2 * | 8/2007 | Hori et al. | ........................ | 74/329 |
| 7,757,576 B1 * | 7/2010 | Einboeck | ........................ | 74/335 |
| 7,878,085 B2 * | 2/2011 | Keyaki et al. | ................ | 74/337.5 |
| 8,015,891 B2 * | 9/2011 | Ogasawara | ..................... | 74/335 |
| 8,082,816 B2 * | 12/2011 | Lai et al. | ....................... | 74/337.5 |
| 8,327,729 B2 * | 12/2012 | Matsumoto et al. | ............ | 74/325 |
| 2007/0006673 A1 * | 1/2007 | Peterman et al. | ............... | 74/329 |
| 2008/0103663 A1 * | 5/2008 | Hiroi | ................................ | 701/54 |
| 2012/0118091 A1 * | 5/2012 | Yamazaki | ........................ | 74/352 |
| 2012/0192665 A1 * | 8/2012 | Gumpesberger et al. | ....... | 74/325 |

* cited by examiner

*Primary Examiner* — Ha D Ho
*Assistant Examiner* — Jude Agendia
(74) *Attorney, Agent, or Firm* — C. G. Mersereau; Nikolai & Mersereau, P.A.

(57) ABSTRACT

A gear-shifting mechanism for vehicles has a crankcase, a gearbox and a reserved room. Because the reserved room is formed between a first case of the crankcase and a body of the gearbox, a shift lever can protrude out of the first case and is mounted into the reserved room to connect to a transmission between the crankcase and the gearbox. Besides, the shift lever also can protrude out of a second case to connect to a transmission opposite to the gearbox. As a result, the shift lever can output in two directions, applicable for the gearbox in left or right of the crankcase. An engine connected to the gear-shifting mechanism can be adapted for various vehicles.

7 Claims, 6 Drawing Sheets

GEAR-SHIFTING MECHANISM FOR VEHICLES

BACKGROUND OF THE INVENTION

1. Field of the Invention

The present invention relates to a gear-shifting mechanism for vehicles, especially to a gear-shifting mechanism for vehicles that can output in two directions and can be adapted for a transmission in the right or the left of the vehicle.

2. Description of the Prior Arts

To vehicles used for all terrains, a gear-shifting mechanism is ordinary mounted in an engine of the vehicles. The gear-shifting mechanism has a crankcase and a transmission. The transmission is connected to the crankcase. The crankcase has a crankshaft, a shift lever shaft, a shift drum, a shift fork and a gear assembly. The shift lever shaft has an output end protruding through the crankcase and connected to a shift lever mechanism of the all-terrain vehicle. The shift drum is connected to the shift lever shaft. The shift fork is connected to the shift drum. The gear assembly is connected to the shift fork. A user can control and actuate the shift lever mechanism, and the shift lever mechanism moves the shift lever shaft, the shift drum, the shift fork and the gear assembly in sequence.

However, the transmission is connected to the crankcase so that the shift lever shaft only can protrude out of a side surface of the crankcase opposite to the transmission. If the transmission lies in right of the crankcase, the shift lever shaft must protrude out of the left of the crankcase and the shift lever mechanism must lie in the left of the all-terrain vehicle. If the transmission lies in left of the crankcase, the shift lever shaft must protrude out of the right of the crankcase and the shift lever mechanism must lie in the right of the all-terrain vehicle. As a result, the conventional gear-shifting mechanism for the all-terrain vehicle can only output in the direction opposite to the transmission and is limited in the applicability when installed on various vehicles.

To overcome the shortcomings, the present invention provides a gear-shifting mechanism for vehicles to mitigate or obviate the aforementioned problems.

SUMMARY OF THE INVENTION

The main objective of the present invention is to provide a gear-shifting mechanism for vehicles that can output in two directions and can be adapted for a transmission in the right or the left of the vehicle.

The gear-shifting mechanism for vehicles has a crankcase, a transmission and a reserved gap. The crankcase has a crankshaft, a shift lever shaft, a shift drum, a shift fork, a gear assembly, a first case and a second case. The first case has a first hole segment corresponding to the shift lever shaft. The second case corresponds to the first case and has a second hole segment corresponding to the shift lever shaft. The transmission is connected to the crankcase and has a transmission wheel assembly, a body and a cover. The transmission wheel assembly is actuated by the crankshaft. The body is connected to the first case. The cover is mounted on the body. The reserved gap is formed between an outside surface of the first case and an outside surface of the body. The crankcase further has a shaft hole formed through the first hole segment, or the crankcase further has a shaft hole formed through the second hole segment, or the crankcase further has two shaft holes respectively formed through the first hole segment and the second hole segment.

The shift lever shaft is connected to a shift lever mechanism of an all-terrain vehicle. Because the reserved gap is formed between the first case of the crankcase and the body of the transmission, the shift lever shaft can protrude out of the first case and is mounted into the reserved gap to connect to a shift lever mechanism between the crankcase and the transmission. Besides, the shift lever shaft also can protrude out of the second case to connect to a shift lever mechanism opposite to the transmission. As a result, the shift lever shaft can output in two directions, applicable for the shift lever mechanism in left or right of the crankcase. An engine connected to the gear-shifting mechanism is applicable for various vehicles.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
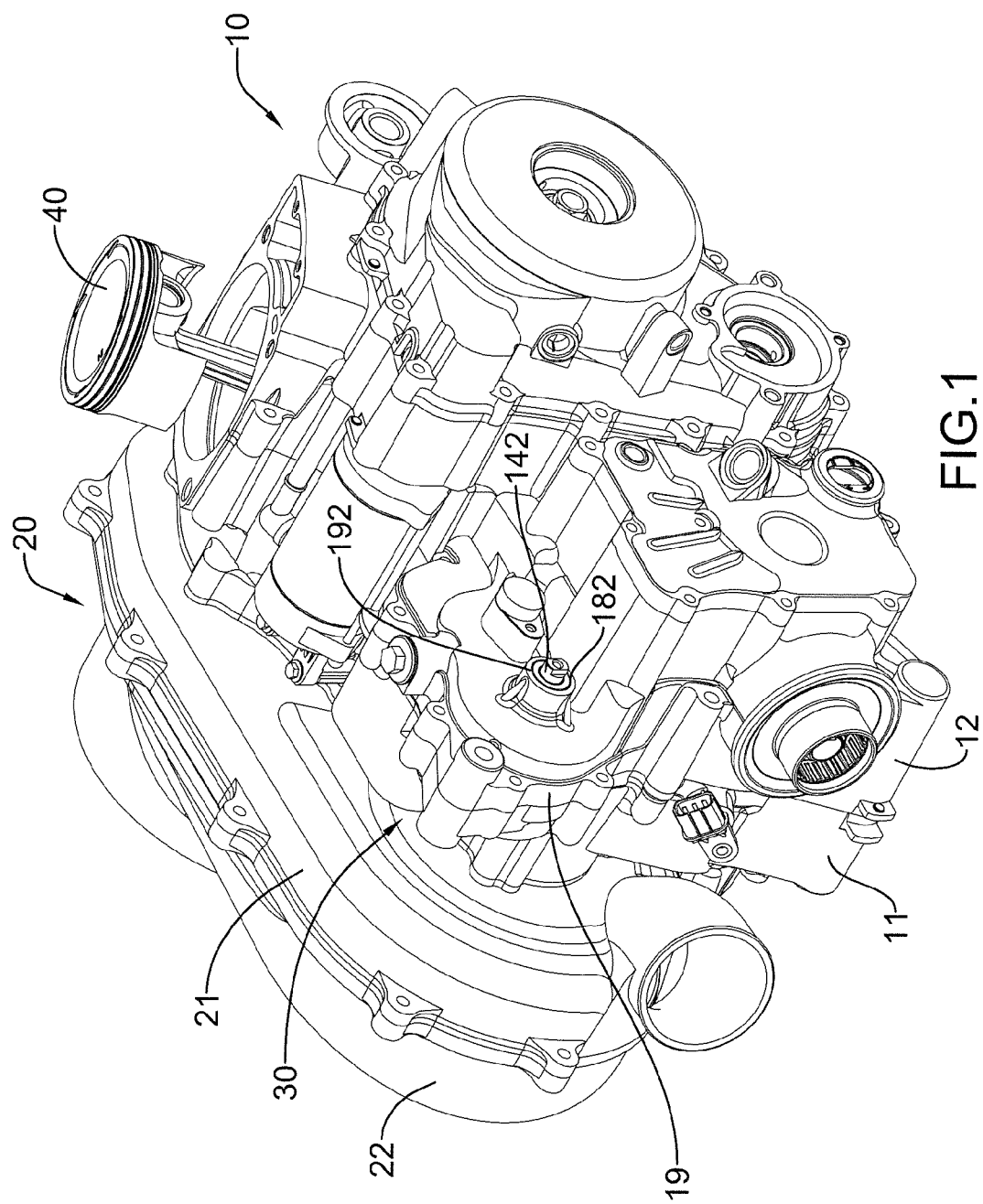
FIG. 1 is a perspective view of a gear-shifting mechanism for vehicles in accordance with the present invention.
Figure 2:
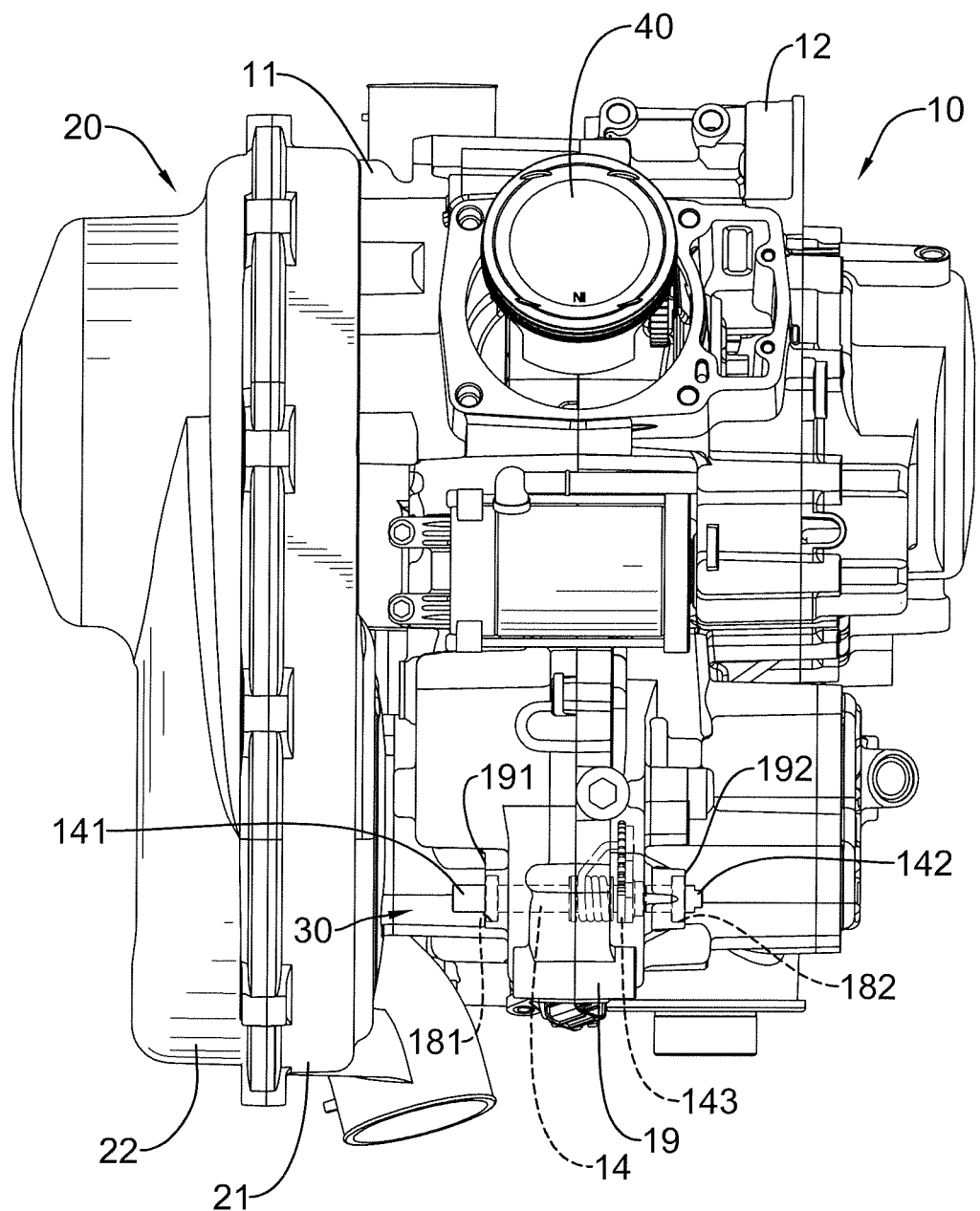
FIG. 2 is a top view of the gear-shifting mechanism for vehicles in FIG. 1.

With reference to FIGS. 1 and 2, a gear-shifting mechanism for vehicles in accordance with the present invention comprises a crankcase 10, a transmission 20 and a reserved gap 30.

Figure 4:
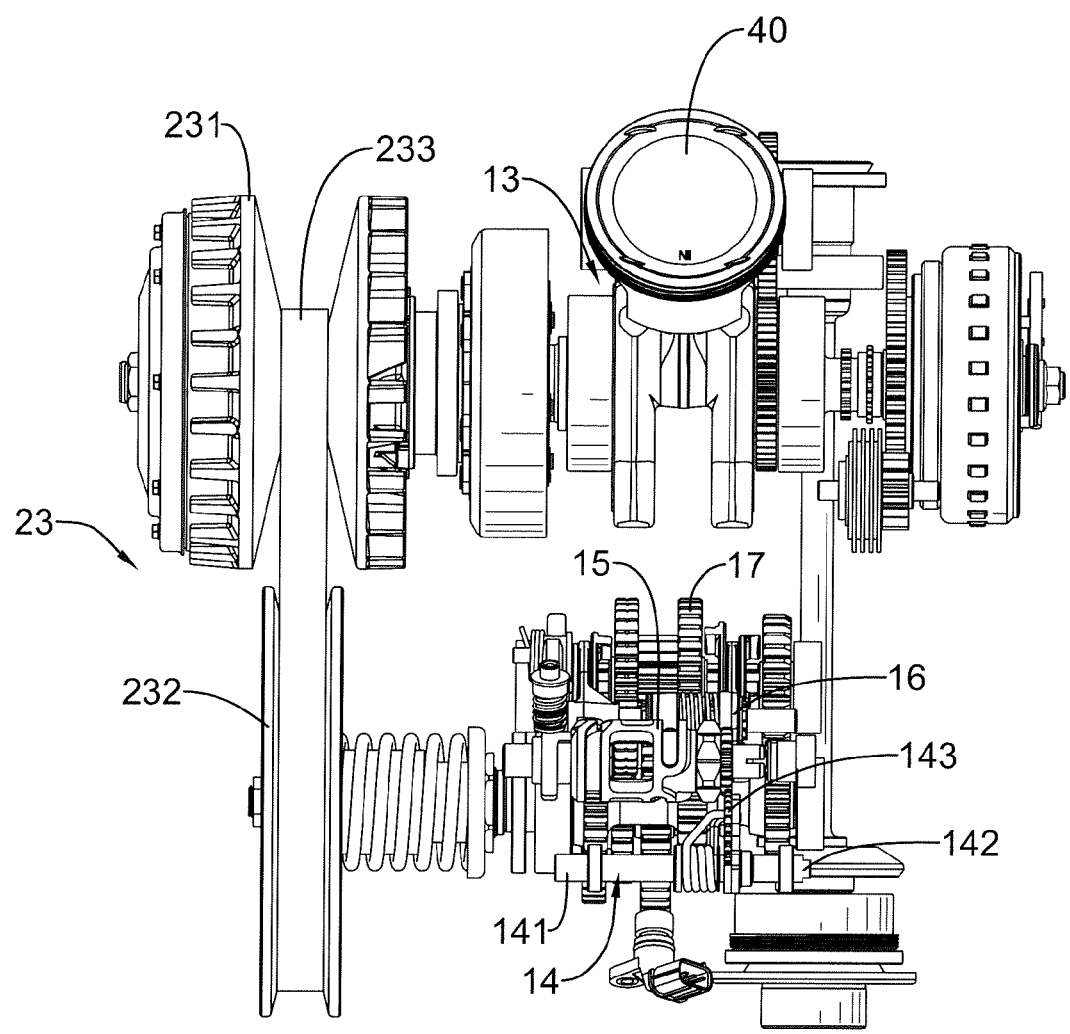
FIG. 4 is a top view of the gear-shifting mechanism for vehicles in FIG. 1, showing elements inside a crankcase and a transmission.

With reference to FIGS. 1, 2 and 4, the crankcase 10 has a first case 11, a second case 12, a crankshaft 13, a shift lever shaft 14, a shift drum 15, a shift fork 16, and a gear assembly 17. The crankshaft 13 has an axis. The first case 11 and the second case 12 are disposed side by side along the axis. The first case 11 has a first hole segment. The first hole segment corresponds to the shift lever shaft 14. The second case 12 corresponds to the first case 11 and has a second hole segment. The second hole segment corresponds to the shift lever shaft 14. The crankcase 10 may further have a shaft hole or two shaft holes. The single shaft hole may be formed through the first hole segment or the second hole segment. The two shaft holes are respectively formed through the first hole segment and the second hole segment. In a preferred embodiment, the shift lever shaft 14 is connected to the shift drum 15. The shift drum 15 is connected to the shift fork 16. The shift fork 16 is connected to the gear assembly 17. The crankcase 10 has a protrusion 19. The protrusion 19 is formed on the crankcase 10 and has a first surface 191 and a second surface 192.

The crankcase 10 and the transmission 20 are disposed side by side along the axis. The transmission 20 is connected to the crankcase 10 and has a body 21, a cover 22 and a transmission wheel assembly 23. The body 21 is connected to the first case 11 of the crankcase 10. The cover 22 is mounted on the body 21. The transmission wheel assembly 23 is actuated by the crankshaft 13.

The reserved gap 30 is formed between an outside surface of the first case 11 and an outside surface of the body 21, and is disposed adjacent to the first hole segment of the first case 11. In a preferred embodiment, the reserved gap 30 is formed between the first surface 191 of the first case 11 and the outside surface of the body 21.

In a preferred embodiment, the crankcase 10 has a single shaft hole, which is a first shaft hole 181. The first shaft hole 181 is formed on the first surface 191 of the protrusion 19. The shift lever shaft 14 has a first output end 141 protruding out of the first shaft hole 181 and mounted in the reserved gap 30.

In a preferred embodiment, the crankcase 10 has a single shaft hole, which is a second shaft hole 182. The second shaft hole 182 is formed on the second surface 192 of the protrusion 19. The shift lever shaft 14 has a second output end 142 protruding out of the second shaft hole 182.

In a preferred embodiment, the crankcase 10 has two shaft holes, and the shaft holes respectively are a first shaft hole 181 and a second shaft hole 182. The first shaft hole 181 is formed on the first surface 191 of the protrusion 19. The second shaft hole 182 is formed on the second surface 192 of the protrusion 19. The shift lever shaft 14 has a first output end 141 and a second output end 142. The first output end 141 protrudes out of the first shaft hole 181 and is mounted in the reserved gap 30. The second output end 142 protrudes out of the second shaft hole 182.

Figure 3:
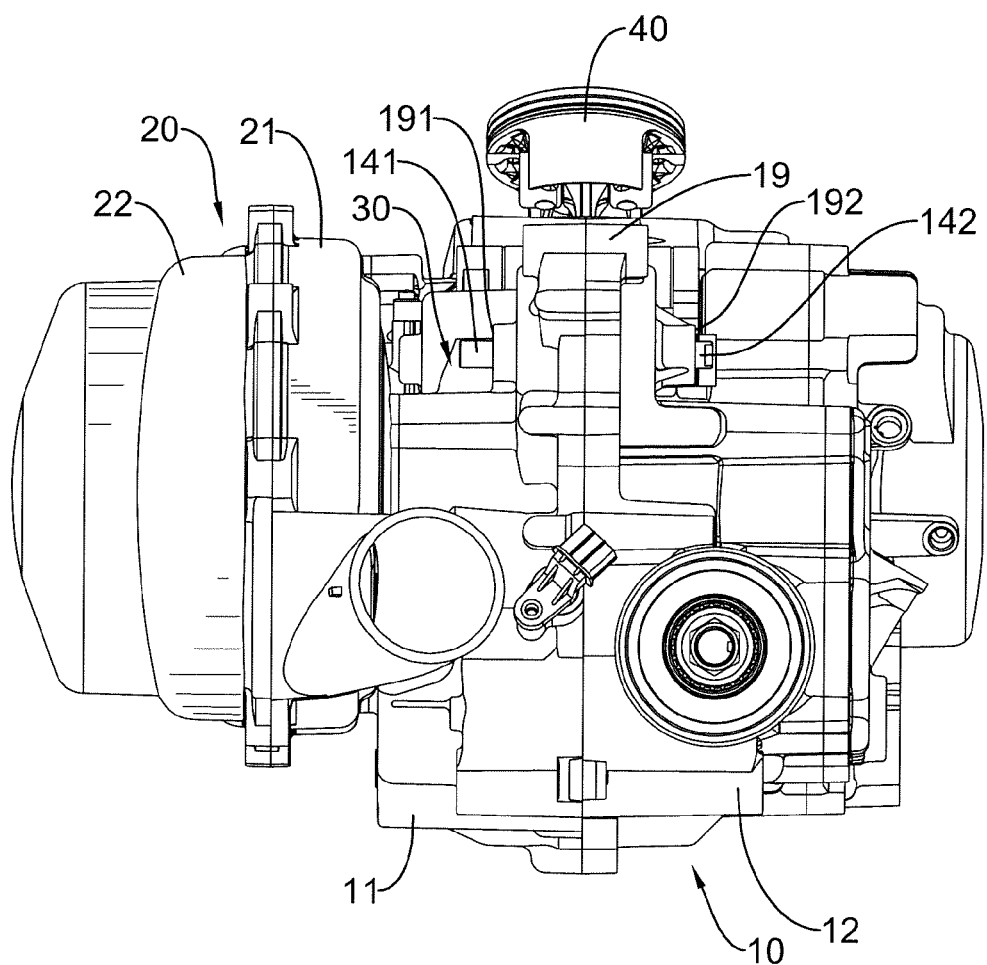
FIG. 3 is a front view of the gear-shifting mechanism for vehicles in FIG. 1.

With reference to FIG. 3, the shift lever shaft 14 is mounted on a middle of the crankcase 10, and the shift lever shaft 14 is below a top edge of the transmission 20 so that the transmission 20 protects the first output end 141 of the shift lever shaft 14 from damage.

Figure 5:
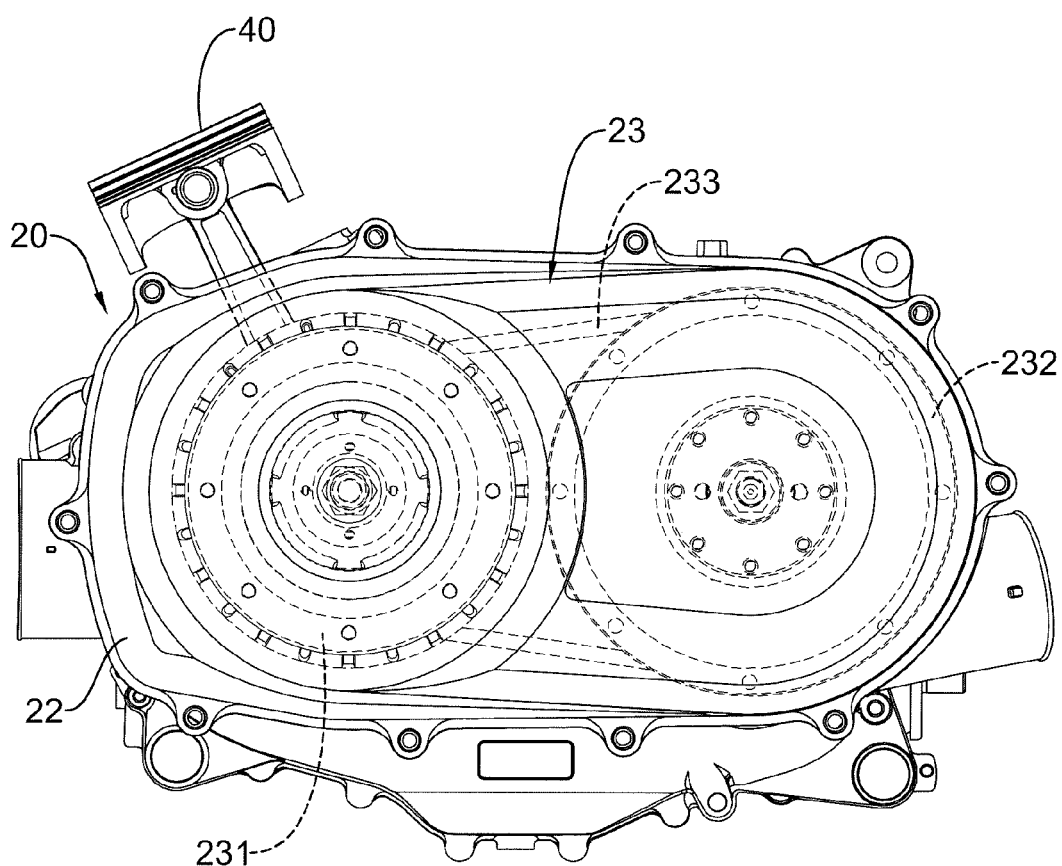
FIG. 5 is a left view of the gear-shifting mechanism for vehicles in FIG. 1, showing elements inside a crankcase and a transmission.

With reference to FIGS. 4 and 5, the crankshaft 13 is actuated by a piston 40 of an engine. The transmission wheel assembly 23 of the transmission 20 has a main driving wheel 231, a secondary driving wheel 232 and a belt 233. The main driving wheel 231 is actuated by the crankshaft 13. The secondary driving wheel 232 is mounted around an output shaft. The belt 233 surrounds the main driving wheel 231 and the secondary driving wheel 232.

Figure 6:
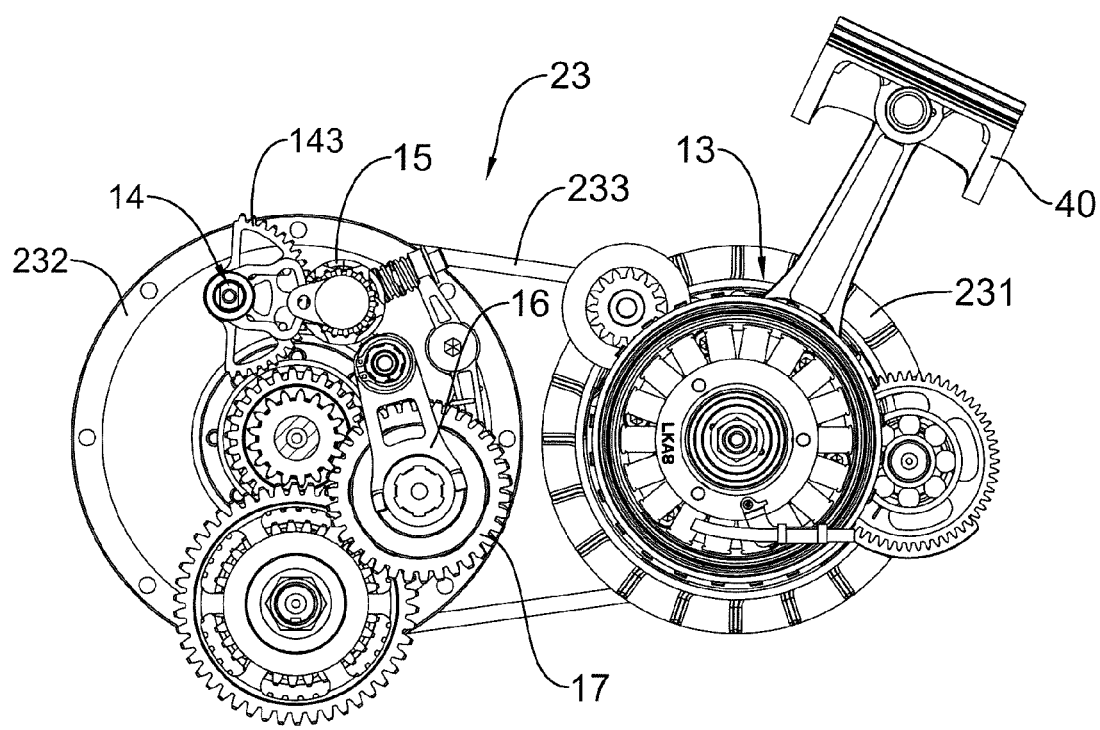
FIG. 6 is a right view of the gear-shifting mechanism for vehicles in FIG. 1, showing elements inside a crankcase and a transmission.

With reference to FIG. 6, the shift lever shaft 14 is connected to a shift lever mechanism of a vehicle, and the shift lever shaft 14 has a sector rack 143 engaging gears of the shift drum 15 and the output shaft. Besides, as mentioned above, the shift drum 15 is connected to the shift fork 16, and the shift fork 16 is connected to the gear assembly 17.

With reference to FIGS. 1 to 4, when the shift lever mechanism is in the left of the vehicle, the shift lever mechanism is connected to the first output end 141 of the shift lever shaft 14 to actuate the shift lever shaft 14. The shift lever shaft 14 rotates the shift drum 15 by the sector rack 143 and the gear. The shift drum 15 rotates and actuates the shift fork 16. The shift fork 16 actuates the gear assembly 17 to shift gears.

When the shift lever mechanism is in the right of the vehicle, the shift lever mechanism is connected to the second output end 142 of the shift lever shaft 14 to actuate the shift lever shaft 14. The shift lever shaft 14 rotates the shift drum 15 by the sector rack 143 and the gear. The shift drum 15 rotates and actuates the shift fork 16. The shift fork 16 actuates the gear assembly 17 to shift gears.

To sum up, because the reserved gap 30 is formed between the first case 11 of the crankcase 10 and the body 21 of the transmission 20, the shift lever shaft 14 can protrude out of the first case 11 to be inserted into the reserved gap 30 to connect to a shift lever mechanism between the crankcase 10 and the transmission 20, or can protrude out of the second case 12 to connect to a shift lever mechanism opposite to the transmission 20. As a result, the shift lever shaft 14 can output in two directions, applicable for the shift lever mechanism in left or right of the crankcase 10. An engine connected to the gear-shifting mechanism can be adapted for various vehicles.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A gear-shifting mechanism for vehicles comprising:
   a crankcase having a crankshaft, a shift lever shaft, a shift drum, a shift fork and a gear assembly mounted therein and having
      a first case having
         a first hole segment corresponding to the shift lever shaft; and
      a second case corresponding to the first case and having a second hole segment corresponding to the shift lever shaft;
   a transmission connected to the crankcase and having
      a transmission wheel assembly actuated by the crankshaft;
      a body connected to the first case; and
      a cover mounted on the body; and
   a reserved gap formed between an outside surface of the first case and an outside surface of the body, and disposed adjacent to the first hole segment of the first case;
   wherein the crankshaft has an axis; the first case and the second case are disposed side by side along the axis; the crankcase and the transmission are disposed side by side along the axis;
   wherein the crankcase further has at least one shaft hole formed through at least one of the first hole segment and the second hole segment;
   wherein the shift lever shaft is connected to the shift drum and a shift lever mechanism, the shift drum is connected to the shift fork, and the shift fork is connected to the gear assembly; the shift lever mechanism moves the shift lever shaft, the shift drum, the shift fork and the gear assembly in sequence.

2. The gear-shifting mechanism for vehicles as claimed in claim 1, wherein
   the first case has a first shaft hole formed through the first hole segment; and
   the shift lever shaft has a first output end protruding out of the first shaft hole and mounted in the reserved gap.

3. The gear-shifting mechanism for vehicles as claimed in claim 1, wherein
   the second case has a second shaft hole formed through the second hole segment; and
   the shift lever shaft has a second output end protruding out of the second shaft hole.

4. The gear-shifting mechanism for vehicles as claimed in claim 1, wherein
   the first case has a first shaft hole formed through the first hole segment;
   the second case has a second shaft hole formed through the second hole segment; and the shift lever shaft has
- a first output end protruding out of the first shaft hole and mounted in the reserved gap; and
- a second output end protruding out of the second shaft hole.

5. The gear-shifting mechanism for vehicles as claimed in claim 4, wherein
- the crankcase has a protrusion formed on the crankcase and having a first surface and a second surface; and
- the first shaft hole is formed on the first surface.

6. The gear-shifting mechanism for vehicles as claimed in claim 5, wherein
- the second shaft hole is formed on the second surface; and
- the reserved gap is formed between the first surface and the outside surface of the body.

7. The gear-shifting mechanism for vehicles as claimed in claim 1, wherein the transmission wheel assembly of the transmission has
- a main driving wheel actuated by the crankshaft;
- a secondary driving wheel mounted around an output shaft; and
- a belt surrounding the main driving wheel and the secondary driving wheel.

* * * * *